United States Patent [19]
Barlage, III et al.

[11] Patent Number: 5,859,775
[45] Date of Patent: Jan. 12, 1999

[54] APPARATUS AND METHOD INCLUDING DEVIATION SENSING AND RECOVERY FEATURES FOR MAKING THREE-DIMENSIONAL ARTICLES

[75] Inventors: William Berdell Barlage, III, Easley; James Richard Asbury, Simpsonville; Robert B. Brown, Duncan; Herbert E. Menhennett, Easley, all of S.C.

[73] Assignee: BPM Technology, Inc., Greenville, S.C.

[21] Appl. No.: 599,635

[22] Filed: Feb. 9, 1996

Related U.S. Application Data

[63] Continuation-in-part of Ser. No. 326,009, Oct. 19, 1994, Pat. No. 5,572,431.

[51] Int. Cl.$^6$ .................................................. G06F 19/00
[52] U.S. Cl. ............................... 364/468.15; 364/468.17; 364/468.26
[58] Field of Search .................... 364/468.15, 468.16, 364/468.17, 468.25, 468.26, 469.03, 474.16, 474.17, 474.19

[56] References Cited

U.S. PATENT DOCUMENTS

| | | | |
|---|---|---|---|
| 4,256,610 | 3/1981 | Hwang | 510/170 |
| 4,369,456 | 1/1983 | Cruz-Uribe et al. | 347/33 |
| 5,149,936 | 9/1992 | Walton, II | 219/121.65 |
| 5,260,009 | 11/1993 | Penn | 264/40.1 |
| 5,303,141 | 4/1994 | Batchelder et al. | 364/149 |
| 5,340,433 | 8/1994 | Crump | 156/578 |
| 5,506,607 | 4/1996 | Sanders, Jr. et al. | 347/1 |
| 5,572,431 | 11/1996 | Brown et al. | 364/468.01 |

FOREIGN PATENT DOCUMENTS

| | | |
|---|---|---|
| 0 420 614 | 4/1991 | European Pat. Off. . |
| 0 581 445 A1 | 2/1994 | European Pat. Off. . |
| 0 606 017 A2 | 7/1994 | European Pat. Off. . |
| 0 606 627 | 7/1994 | European Pat. Off. . |
| 62-122727 | 4/1987 | Japan . |
| 92/08200 | 5/1992 | WIPO . |
| 92/18323 | 10/1992 | WIPO . |
| 95/05943 | 3/1995 | WIPO . |
| 96/12607 | 5/1996 | WIPO . |
| 96/12609 | 5/1996 | WIPO . |

*Primary Examiner*—William A. Cuchlinski, Jr.
*Assistant Examiner*—Edward J. Pipala
*Attorney, Agent, or Firm*—Allen, Dyer, Doppelt, Milbrath & Gilchrist, P.A.

[57] ABSTRACT

A three-dimensional article making apparatus includes a build material dispenser for dispensing build material based upon the article defining data, and a deviation sensor for sensing a deviation during construction of the article. The apparatus may operate the build material dispensing means to adjust or recover for a sensed deviation during construction of the article. A portion of dispensed build material may be removed responsive to a sensed deviation. In addition, the deviation sensor may be operated a plurality of times during construction of the article, and a portion of dispensed build material may be removed down to a previous desired article portion. The deviation sensor may be provided by article formation deviation sensor, a build material dispenser sensor, an article defining data deviation sensor, and/or a build rate deviation sensor. The article deviation sensor may cooperate with a heated electrically conductive body used to periodically dimensionally normalize the article. Method aspects of the invention are also disclosed.

28 Claims, 14 Drawing Sheets

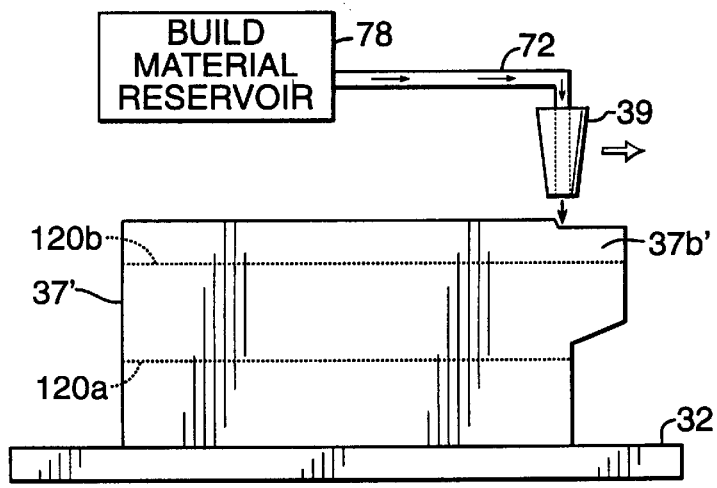
FIG. 16
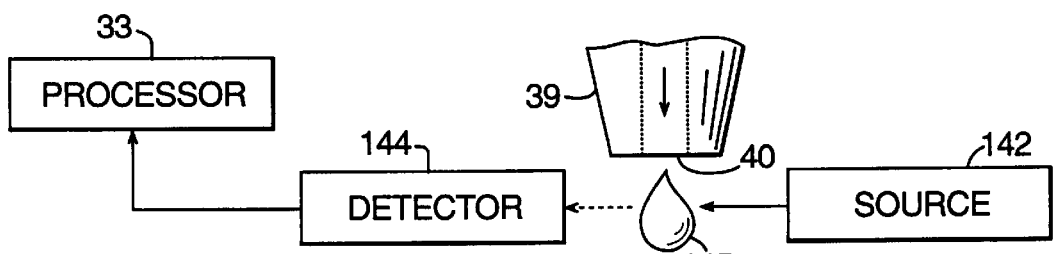
FIG. 17
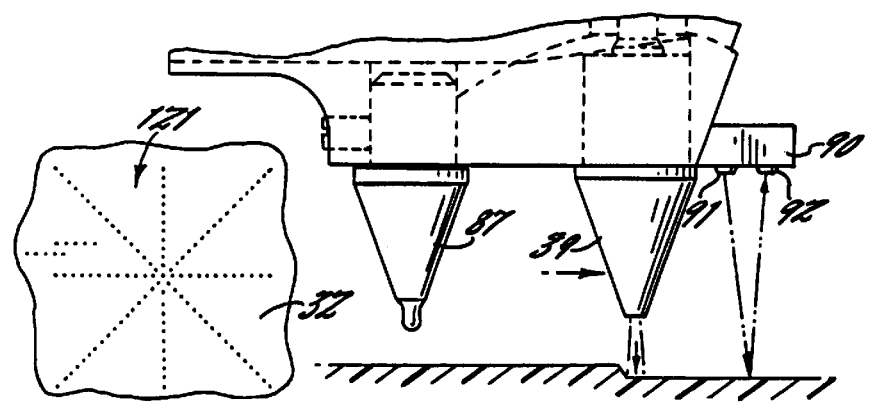
FIG. 19    FIG. 18 ated method to allow a designer to quickly and relatively inexpensively make an arbitrary three-dimensional article with high accuracy.

APPARATUS AND METHOD INCLUDING DEVIATION SENSING AND RECOVERY FEATURES FOR MAKING THREE-DIMENSIONAL ARTICLES

CROSS REFERENCE TO RELATED APPLICATIONS

This application is a continuation-in-part patent application of U.S. patent application Ser. No. 326,009, filed Oct. 19, 1994 now U.S. Pat. No. 5,572,431, issued Nov. 5, 1996. This application is also related to U.S. patent application Ser. No. 08/326,015 (allowed on Jul. 14, 1994), U.S. patent application Ser. No. 08/325,889 (now U.S. Pat. No. 5,555, 176), U.S. patent application Ser. No. 08/325,694 (now abandoned), and U.S. patent application Ser. No. 08/326,004 (now U.S. Pat. No. 5,633,021).

FIELD OF THE INVENTION

The invention relates to an apparatus and related methods for making a three-dimensional article, and more particularly, to an apparatus and advanced methods for making an article based upon article defining data.

BACKGROUND OF THE INVENTION

In the design and manufacture of a three-dimensional article, it is common practice to first create an initial design and then manually produce a custom prototype, or model, of the article based upon the initial design. After reviewing the initial prototype, design revisions are often made requiring the production of yet another prototype. This process of review and redesign may be repeated a number of times before finding the desired design thereby requiring a number of iterative steps to produce a single finished article. Accordingly, the process of designing and prototyping an article may involve considerable time, effort and expense.

Computer aided design (CAD) is commonly used for automating the design process. With the aid of a suitable computer, an operator is able to design a three-dimensional article and display the design on a two-dimensional medium, such as a display screen or paper. A significant advance in the art of three-dimensional design and modeling is disclosed in U.S. Pat. No. 4,665,492 to Masters entitled "Computer Automated Manufacturing Process and System." This patent discloses an apparatus including a positionable ejection head for ballistically emitting small mass particles to construct a three-dimensional article based upon article defining data. In other words, the patent discloses the advantageous combination of CAD with an apparatus for precisely constructing the article based upon the generated CAD data.

Another method and apparatus for forming three-dimensional objects is disclosed in U.S. Pat. No. 5,136,515 to Helinski entitled "Method and Means for Constructing Three-Dimensional Articles by Particle Deposition." This patent discloses a device including two positionable jetting heads with two feeder lines connected to respective remote sources of melted wax, for example, to provide both object and support material.

The formation of three-dimensional articles by jetting a photosetting or thermosetting material is disclosed in U.S. Pat. No. 5,059,266 to Yamane et al. entitled "Apparatus and Method for Forming Three-Dimensional Article." A jet sequentially or intermittently jets the photosetting or thermosetting material in a droplet form along a flight path to a stage on which the article is constructed.

A conventional jet or jetting head may require a constant, uninterrupted, supply of liquid build material delivered thereto. If the supply is interrupted, the processor or controller may still continue to position and attempt to fire the jet. However, a portion of the article may fail to be formed if the flow of material is interrupted.

U.S. Pat. No. 5,260,009 to Penn entitled "System, Method, and Process for Making Three-Dimensional Objects" discloses yet another apparatus for forming three-dimensional articles wherein a second or support material is dispensed with each layer of the three-dimensional article as it is formed, and wherein feeder lines provide a source of the liquid material to a plurality of jets carried by a movable head. An inspection station is provided for the jets and includes a conveyor belt which received drops of melted media from the jets. An optical sensor scans the parallel lines produced by simultaneous operation of the jets. If a jet is malfunctioning, the jets are directed to complete a purge-and-wipe for expulsion of any foreign matter. Proper operation of the jets is determined before beginning formation of an article; thus, errors occurring during construction of an article would go undetected. In addition, wiping of the jets may unfortunately serve to introduce foreign matter into the relatively small jet orifices, thereby plugging the orifices.

U.S. Pat. No. 5,303,141 to Batchelder et al. entitled "Model Generation System Having Closed-Loop Extrusion Nozzle Positioning" discloses an apparatus including an extrusion head for extruding a bead of material, such as a hot melt adhesive. A feedback sensor is provided to permit the extruder to adjust to a number of different mechanisms. For example, when the extruded bead is applied around a convex or concave contour the bead, while it is still hot enough to be pliable, the bead tends to distort to minimize its length. Also, and dependent on the distance from the nozzle to the underlying material, the extruded bead may change its deposited cross-section as a function of this distance. Also, back pressure from already deposited material that is near the nozzle may reduce the flow rate out of the nozzle, and changes in temperature or composition of the material to be extruded may change the rate at which the material flows out of the nozzle and, as a result, the rate at which the material solidifies to its final dimension. The patent discloses that the feedback provided by the sensor is important to permit the extruder to adjust to a number of different mechanisms which may operate to cause only the extruded material to have dimensions other than those intended. However, many other factors may affect accuracy, and the speed of construction of the intended article. In addition, the patent discloses that the deposition feedback sensor functions to provide information regarding only the most recently extruded material. Accordingly, errors which occur subsequently in the article may go undetected.

SUMMARY OF THE INVENTION

In view of the foregoing background, it is therefore an object of the invention to provide an apparatus and associated method to allow a designer to quickly and relatively inexpensively make an arbitrary three-dimensional article with high accuracy.

It is another object of the present invention to provide an apparatus and related method for making a three-dimensional article that can tolerate a deviation during construction of the article, yet recover from any deviation and efficiently and accurately construct the article.

These and other objects, features, and advantages of the present invention are provided by an apparatus for making a three-dimensional article based upon article defining data and comprising build material dispensing means for dispensing build material based upon the article defining data, and deviation sensing means for sensing a deviation during construction of the article. The apparatus may preferably include a platform upon which the article is constructed.

In one embodiment, the deviation sensing means may be provided by article formation deviation sensing means for sensing a deviation in formation of the article during construction thereof, such as when a portion of the article is malformed or fails to form, for example. More particularly, the apparatus preferably includes normalization means for dimensionally normalizing the article at predetermined intervals during construction. The article formation deviation sensing means may comprise temperature sensing means operatively connected to the normalization means for sensing a deviation in formation of the article during normalization thereof based upon a sensed difference in temperature of the normalization means when in contact with adjacent portions of build material and when not in contact with build material, as when a portion of the article has failed to form.

In another embodiment of the invention, the normalization means may be provided by a movable heated body and wherein the heated body is electrically conductive. Accordingly, the article formation deviation sensing means may sense electrical conductivity between the electrically conductive body and adjacent conductive dispensed build material of the article. Since the normalization means is preferably operated at predetermined intervals during construction of the article, the article formation deviation sensing means is also preferably operated concurrently with the normalization means at predetermined intervals.

Recovery means may be provided to correct for a deviation in the formation of the article. The recovery means may provide a patch for a missing portion of the article. In addition, the recovery means may also preferably include removing means for removing a portion of dispensed build material responsive to a sensed deviation. The removing may be achieved by operating the normalization means to remove article portions down to a previously known good level or position. For example, a meltable build material may be heated, melted and displaced to remove a portion of the article. In addition, vacuum means may be provided for completely removing melted dispensed build material. The recovery means may also preferably include resuming means cooperating with the build material dispensing means for resuming construction of the article after a portion of dispensed build material has been removed responsive to a sensed deviation.

In another embodiment, the deviation sensing means may be provided by jet dispensing deviation sensing means for sensing a deviation in dispensing of build material from a build material jet which dispenses build material in a plurality of droplets. The jet dispensing deviation sensing means may be provided by orifice sensing means, such as implemented by an optical sensor, for sensing build material dispensed from the orifice.

The recovery means may preferably comprise purging means for purging the build material jet and the feeding means. The recovery means may also preferably include orifice cleaning means for cleaning the orifice and adjacent portions of the build material jet. One embodiment of the orifice cleaning means may, in turn, include a body of absorbent material, and jet positioning means for moving the jet so that the orifice and adjacent portions of the jet contact the body of absorbent material to remove undesired accumulated build material, for example. In particular, the body of absorbent material is preferably cylindrical in shape and is rotatably mounted. Accordingly, the jet positioning means may desirably advance the jet along a predetermined path of travel intersecting outer peripheral portions of the body of absorbent material so that the orifice and adjacent portions of the build material jet contact the outer peripheral portions of the cylindrical body of absorbent material without a wiping motion. The positioning of the jet also serves to rotate the body of absorbent material to present a different peripheral outer surface portion on a next or successive cleaning.

Another embodiment of cleaning means may be provided by wet cleaning means which, in turn, comprises means for applying a cleaning liquid to an orifice portion of the build material jet, such as prior to purging build material jet. In other words, the wet cleaning means may include a container for liquid cleaning solution and brush means for applying the cleaning solution to the orifice of the jet. The wet cleaning may be performed prior to purging or as otherwise needed.

The recovery means may further comprise testing means for testing if the build material jet is operating properly after being purged and/or cleaned. For example, a test pattern may be formed and optically inspected to verify proper operation of the build material jet and related components.

In yet another embodiment of the invention, the deviation sensing means comprises article data deviation sensing means for sensing a deviation of the article defining data during construction of the article. In other words, an article even while being made, can have a portion thereof redesigned and reconstructed to increase efficiency and overall throughput.

In still another embodiment, the deviation sensing means may be provided by build rate deviation sensing means for periodically sensing a build rate of the build material jet. In this embodiment, the recovery means preferably includes means cooperating with the build rate deviation sensing means for constructing the article based upon different build rates.

A method aspect of the invention is for making a three-dimensional article based upon article defining data. The method preferably comprises the steps of: dispensing build material from a build material dispenser based upon the article defining data to construct the article; dimensionally normalizing the article during construction thereof; and sensing a deviation in formation of the article during dimensional normalization of the article. The deviation may be recovered from by patching, or removing and rebuilding portions of the article.

BRIEF DESCRIPTION OF THE DRAWINGS

FIG. 16 is a schematic block diagram of a portion of the apparatus according to the invention illustrating resuming construction of a new article portion after removal of an undesired portion.

FIG. 17 is a schematic block diagram of a portion of an embodiment of the apparatus according to the invention illustrating an optical sensor associated with the orifice of the build material dispenser jet.

FIG. 18 is a schematic block diagram of a portion of the apparatus according to the invention illustrating sensing of a test pattern.

FIG. 19 is a plan view of the test pattern being produced and analyzed by the apparatus as shown in FIG. 18.

DETAILED DESCRIPTION OF THE PREFERRED EMBODIMENTS

Figure 1:
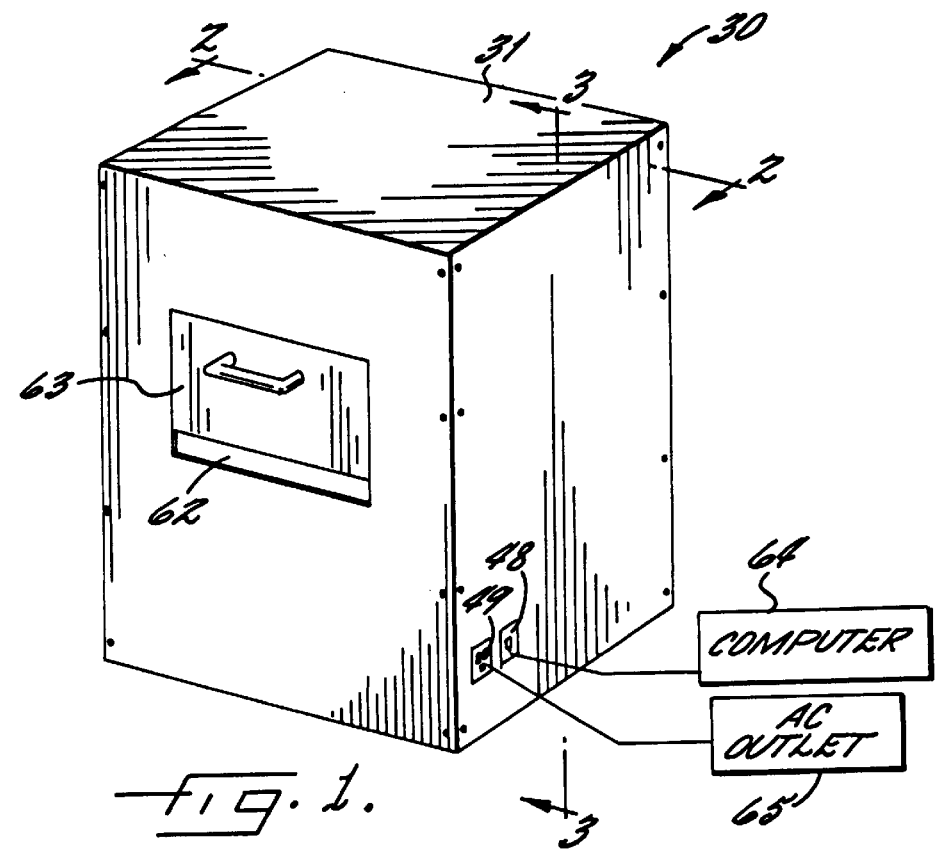
FIG. 1 is a perspective view of the apparatus for forming three-dimensional articles according to the invention.
Figure 4:
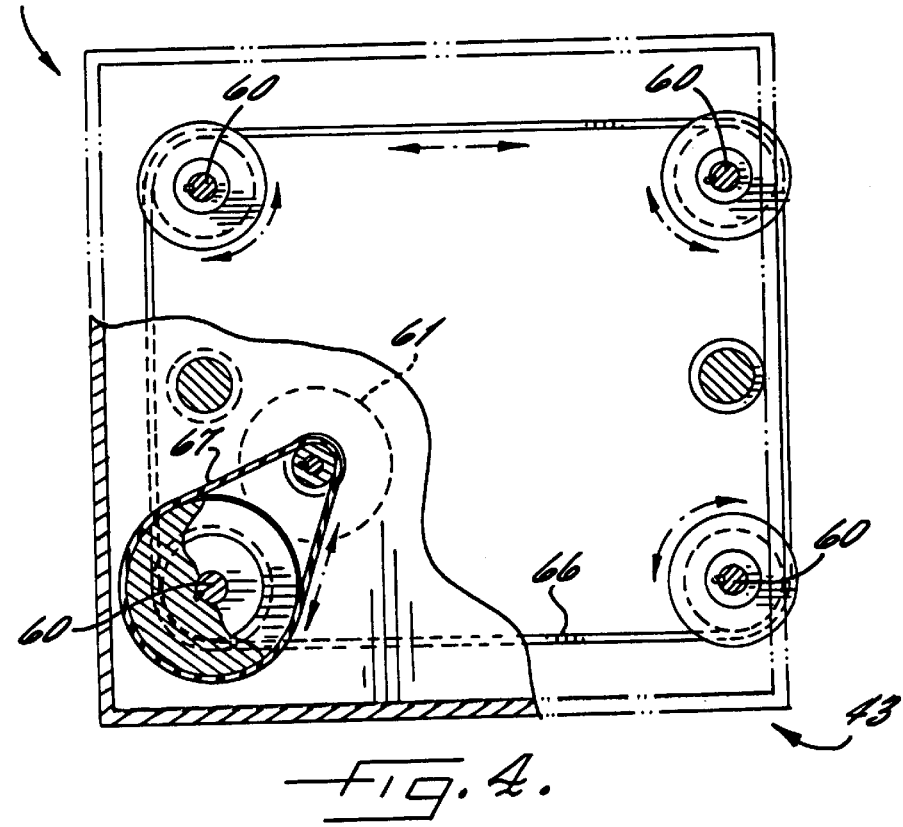
FIG. 4 is a sectional view of the apparatus taken along lines 4—4 of FIG. 2.
Figure 2:
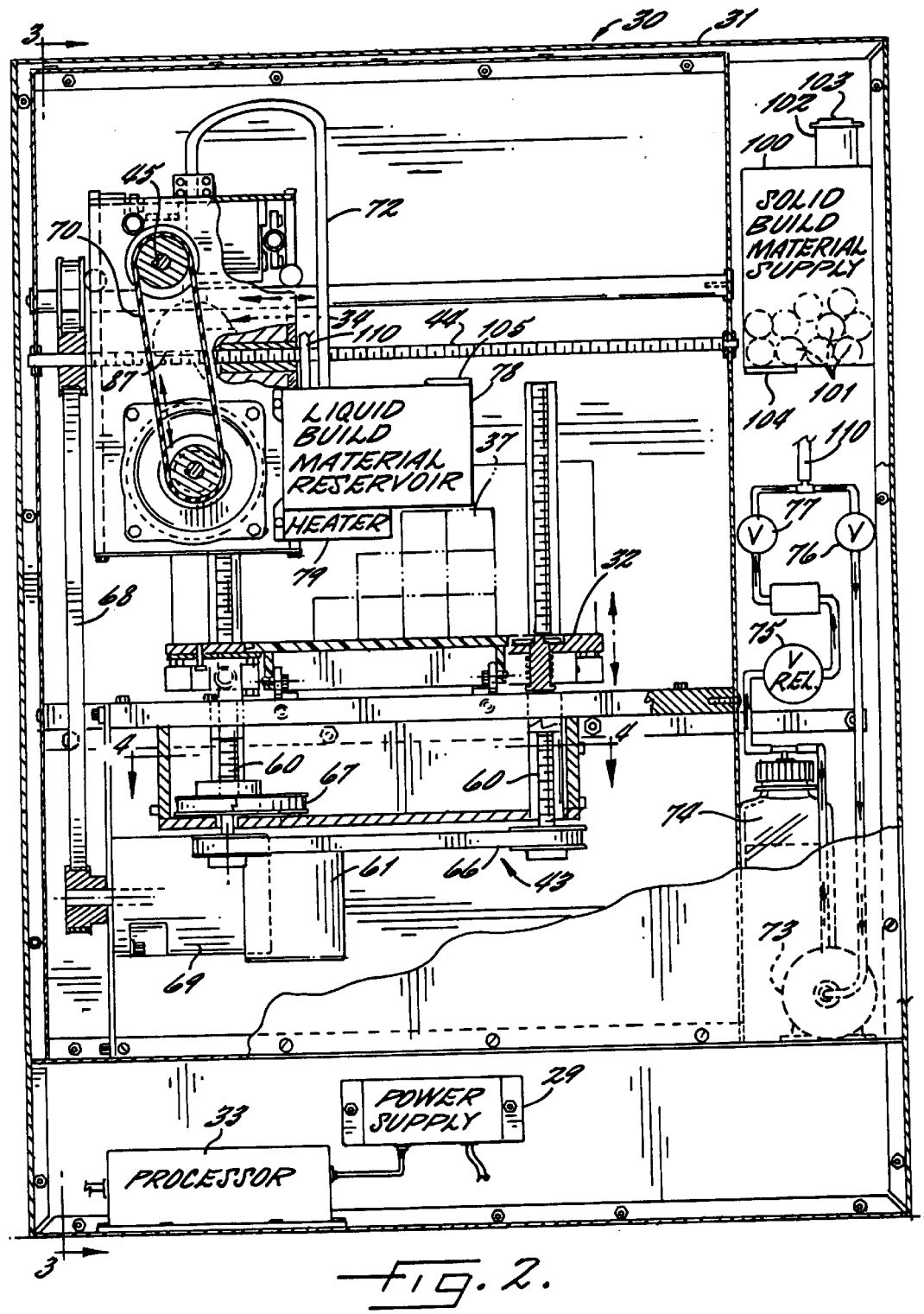
FIG. 2 is a sectional view of the apparatus taken along lines 2—2 of FIG. 1.
Figure 3:
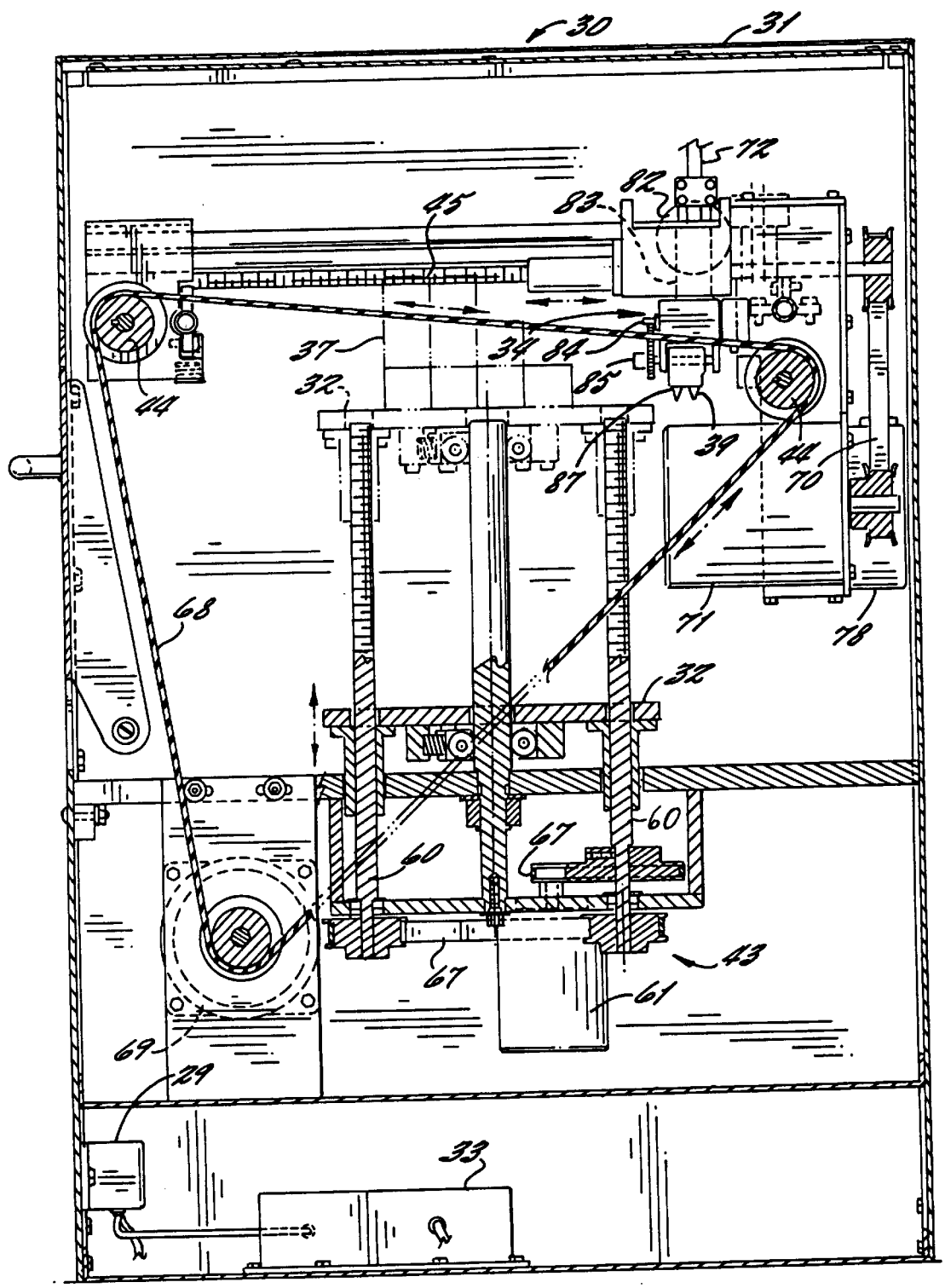
FIG. 3 is a sectional view of the apparatus taken along lines 3—3 of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout and prime notation is used to indicate similar elements in alternate embodiments.

Referring initially to FIGS. 1–5, the three-dimensional article manufacturing apparatus 30 according to the invention is now described. The apparatus 30 includes a generally rectangular frame or housing 31 having an access opening 62 closed by a sliding door 63. A power port 49 facilitates electrical connection to an external power source, such as from an AC outlet 65. A computer port 48 allows connection to an external computer 64. An external computer 64, such as a work station or personal computer, may be used to generate a digital data file containing the three-dimensional coordinate data defining an article or model to be built. For example, the data may be from an STL file which defines the article in triangular facets, as would be readily understood by those skilled in the art.

In addition, it will be understood by those having skill in the art that the data file may be transferred to the apparatus by a transferable memory medium such as a magnetic disk or tape, or a microelectronic memory, not shown. Accordingly, the apparatus 30 may be adapted to receive coordinate data from any number of sources having the appropriate electronic data format. If data is transferred by a transferable memory medium, for example, the apparatus 30 may include a disk drive, a tape reader, or other means for reading electronic data from a transferable memory medium. The apparatus 30 includes a processor 33 which receives the digital data file and translates the coordinate data therein to control signals, as described further herein. The apparatus 30 also includes a power supply 29.

The apparatus 30 includes a platform 32 on which the article 37 is built, and a ballistic jetting head 34 from which droplets of liquid build material are jetted. More particularly, the jetting head 34 may include a piezoelectric jet 39 carried by jetting head 34 for dispensing build material in a plurality of droplets toward the platform 32 to construct the article 37. The build material is normally solid when at the temperature of the interior of the apparatus, but is heated to a liquid for delivery to the jetting head as described in greater detail below. In other words, the heated liquid droplets of build material are jetted from the jetting head 34 to an intended landing position on either the platform 32 or a portion of previously jetted build material. On contact with the platform or previously jetted build material, the heated liquid droplets cool and solidify.

The piezoelectric jet 39 may also be positioned relatively close to the target position so that the build material may, in a sense, not be considered as traveling ballistically. Accordingly, the terms ejected and jetted are also used herein and describe a relatively small gap or no gap. The illustrated piezoelectric jet 39 is but one embodiment of a dispenser for dispensing build material in metered quantities and to precise target landing positions. It being readily understood by those of skill in the art, that other types of build material dispensers are also contemplated by the invention that can meter build material and accurately deliver it to a target position.

In a preferred embodiment, the apparatus 30 includes positioning means for moving the jetting head 34 in relation to the platform 32. Orthogonal screw drive shafts facilitate the movement of the jetting head 34 in the X- and Y-directions relative to the platform 32. As illustrated, a pair of X-axis drive shafts 44, which are driven by X-axis motor 69 and X-axis drive belt 68, facilitate movement of the jetting head 34 in the X-direction. Y-axis drive shaft 45, which is driven by Y-axis drive motor 71 and Y-axis drive belt 70 facilitates movement of the jetting head 34 in the Y-direction. As will be understood by those having skill in the art, movement of the jetting head 34 in the X-Y plane may also be provided by an r/θ positioner including an arm adapted for radial movement at an angle θ, and a positioner for positioning the jet at a radius, r, along the arm.

In the illustrated embodiment, relative movement in the Z-direction is provided by a Z-axis positioner 43 which moves the platform 32 up and down in the Z-direction. The Z-axis positioner includes vertical drive shafts 60 which engage the platform 32. The drive shafts 60 are driven by the vertical drive motor 61 and vertical drive belts 66 and 67.

Figure 5:
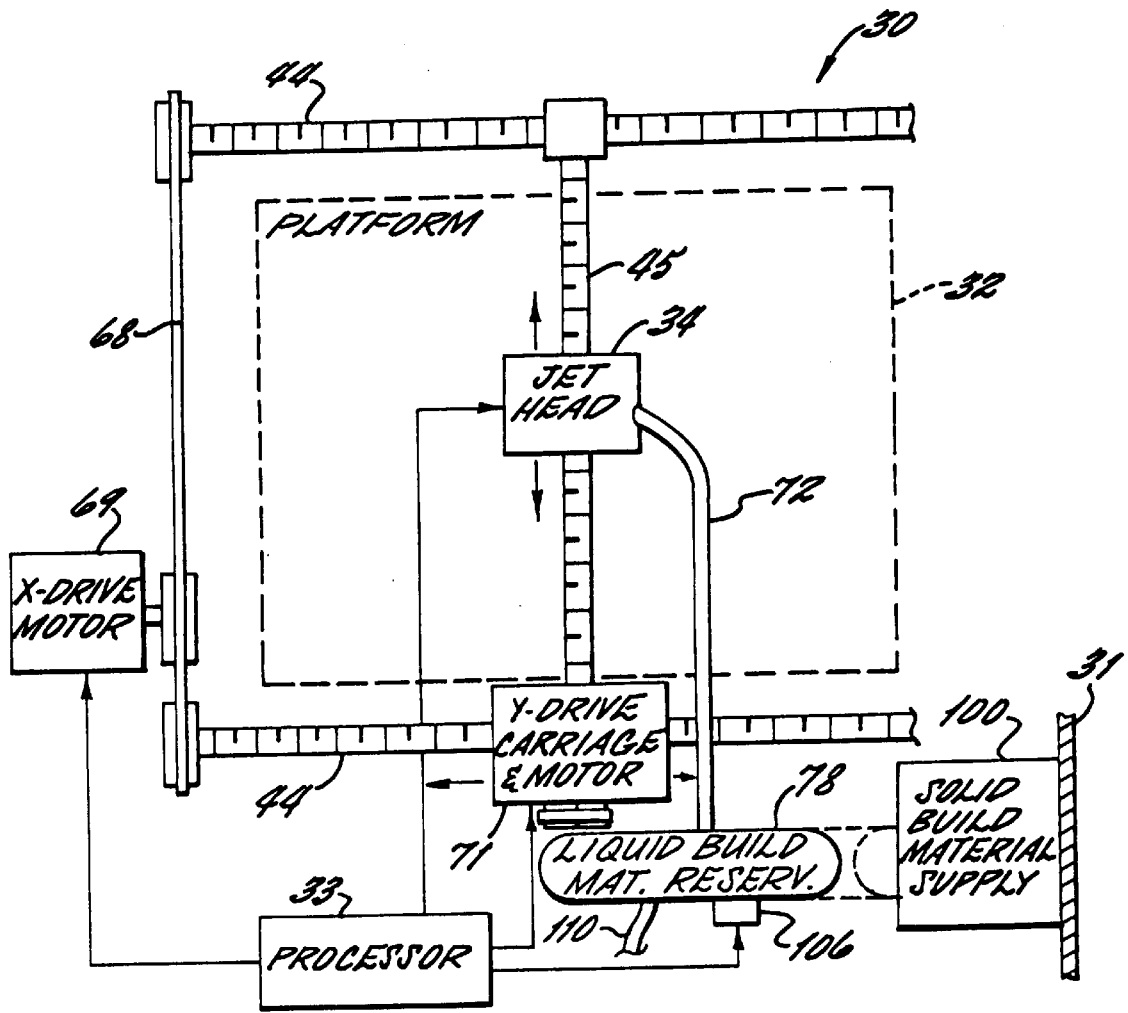
FIG. 5 is a schematic top plan view of a portion of the apparatus according to the invention illustrating positioning of the build material jetting head and delivery of build material thereto.

Referring now more particularly to FIG. 5, the movable build reservoir 78 of the present invention is described in greater detail. The apparatus 10 includes a liquid build material reservoir 78 for supplying liquid build material to the jetting head 34 via a flexible heated tube 72. The build material reservoir 78 may include an electrical resistance heater 79 (FIG. 2) associated therewith for maintaining the build material in the liquid state as would be readily appreciated by those skilled in the art.

The build material reservoir 78 is mounted on the first or Y-direction positioner which includes a movable carriage supporting a first drive motor 71 so that the flexible connecting tube 72 need only flex to accommodate positioning of jetting head 34 along the first or Y-direction, but not along the second or X-direction. Accordingly, the possibility of disrupting liquid build material delivery to through the flexible tube 72 and to the jetting head 34 is significantly reduced. In addition, the inertia of the jetting head 34 can be kept desirably low for high speed and accurate movement, since the jetting head need not include its own source or reservoir of liquid build material. Further, movement of the liquid build material reservoir 78 ensures a homogenous mixture, and also helps to release air bubbles in the liquid build material.

As illustrated, the first and second directions are preferably each linear and orthogonal to one another. In addition, a third or Z-direction positioner 43, as described above, is provided for positioning the 32 platform relative to jetting head 34 along a third direction orthogonal to both the first and second directions. The processor 33 preferably cooperates with the first, second, and third positioners for moving the jetting head 34 along a predetermined path of travel to construct the three-dimensional article based upon article defining data.

In particular, the apparatus 30 also preferably includes a solid build material supply means 100 mounted on a portion of the apparatus frame 31. The solid build material supply means 100 stores build material in solid form, such as in the illustrated form of spheres 101, although other shapes and sizes are contemplated by the invention as would be readily understood by those skilled in the art. The solid build material supply means 100 may also include a filler tube 102 and cap 103 as shown to permit replenishment of solid build material by an operator.

The apparatus 30 preferably comprises docking means, cooperating with said first and second positioners, for selectively positioning the build material reservoir 78 adjacent the solid build material supply means 100 and for replenishing build material within the build material reservoir from the solid build material supply means. For example, the liquid build material reservoir 78 and the solid build material supply means 100 may include a corresponding covered openings 105, 104 (FIG. 2) which mate and cooperatively function for permitting transfer of solid build material 101 to the build material reservoir 78. Once in the liquid build material reservoir 78, the solid build material is quickly converted to liquid by the heater 79 and any liquid build material within the reservoir.

The apparatus 30 preferably further comprises a build material level sensor 106 (FIG. 5) associated with build material reservoir 78 and cooperating with the docking means for initiating replenishment of the build material reservoir responsive to a low level of build material within the build material reservoir. In other terms, the processor 33 preferably provides the control functions for operating the positioners in response to the sensed low level of liquid build material to replenish the supply of build material within the reservoir 78.

The build material reservoir 78 may also be connected to a pneumatic system via a tube 110 for applying either vacuum or pressure to the liquid build material. The pneumatic system includes a pump 73, an accumulator 74, a pressure regulator 75, a purge valve 76, and a fill valve 77. The pneumatic system is for emptying and filling the piezoelectric jet 39 and heated tube 72 responsive to certain operating conditions as described further in copending U.S. patent application Ser. No. 08/326,015, entitled "Apparatus and Method for Dispensing Build Material to Make a Three-Dimensional Article," assigned to the assignee of the present invention, and the entire disclosure of which is incorporated herein by reference.

A relatively constant level of liquid build material may be maintained in the build material reservoir 78, so that the surface level of the liquid build material in the build material reservoir 78 is maintained at a relatively constant elevation with respect to the piezoelectric build material jet 39. In preferred embodiments, the jet 39 may be situated above the surface level of the liquid build material, such as about 1 to 3 inches above the surface level of the liquid build material, to thereby maintain a negative meniscus at the orifice of the piezoelectric jet 39. Alternatively, a vacuum could be applied to the liquid build material, such as by coupling a vacuum source to the reservoir 78. The negative meniscus increases the accuracy and uniformity of successive jetted droplets and also reduces undesirable accumulation of build material adjacent the orifice 40 of the jet 39.

Figure 6:
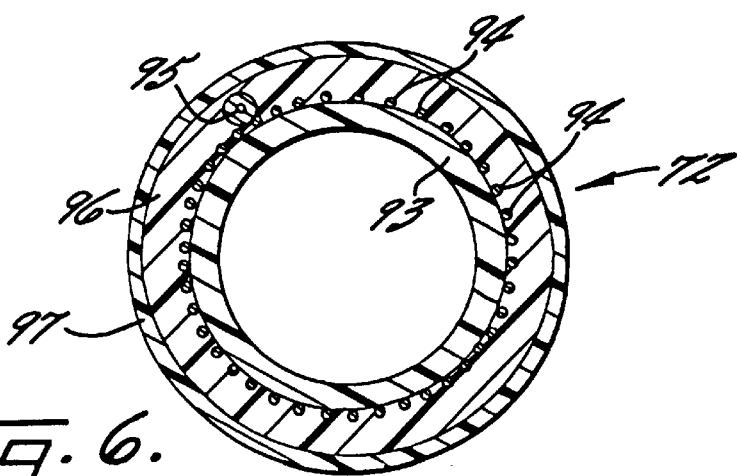
FIG. 6 is a greatly enlarged cross-sectional view of the heated tube connecting the build material reservoir to the build material jetting head.

As illustrated in FIG. 6, the flexible tube 72 may include a flexible interior layer 93, formed of a durable material such as VITON. The interior layer may be surrounded by a thermally conductive layer, such as the illustrated wire mesh braid 94. The wire may be copper which is a good thermal conductor. An insulated electrically resistive wire heating element 95 may be spirally wrapped around the wire mesh braid 94. The heating element may be Nichrome wire surrounded by an electrical insulator. The tube 72 is thus uniformly heated by passing an electrical current through the heating element 95 with the braided wire layer serving to distribute heat. An intermediate layer 96 of thermally insulating material, such as fiberglass, surrounds the heating element 95 and the wire mesh braid 94. The structure is surrounded by an outer protective layer 97, such as provided by heat shrink tubing.

Figure 7:
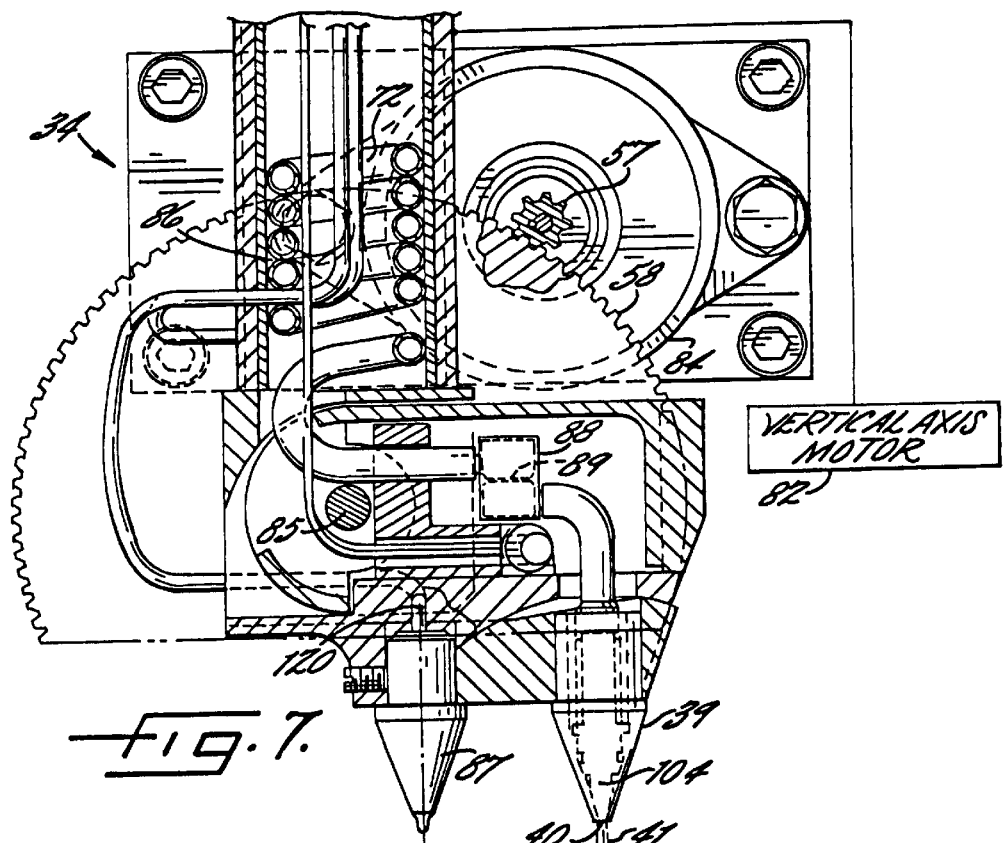
FIG. 7 is a greatly enlarged side view, partially in section, of a portion of the apparatus according to the invention illustrating the build material jetting head positioned to have a vertical firing direction.
Figure 8:
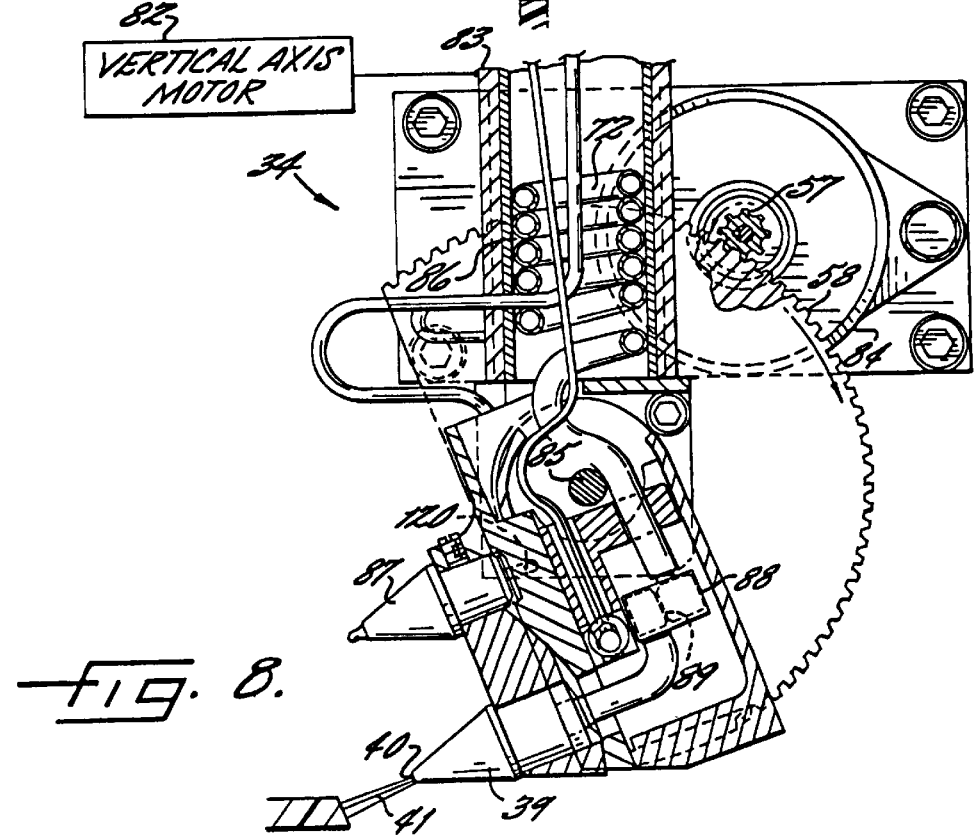
FIG. 8 is a greatly enlarged side view, partially in section, of a portion of the apparatus according to the invention illustrating the build material jetting head positioned to have a near horizontal firing direction based upon rotation about a horizontal axis or flip angle positioning.
Figure 9:
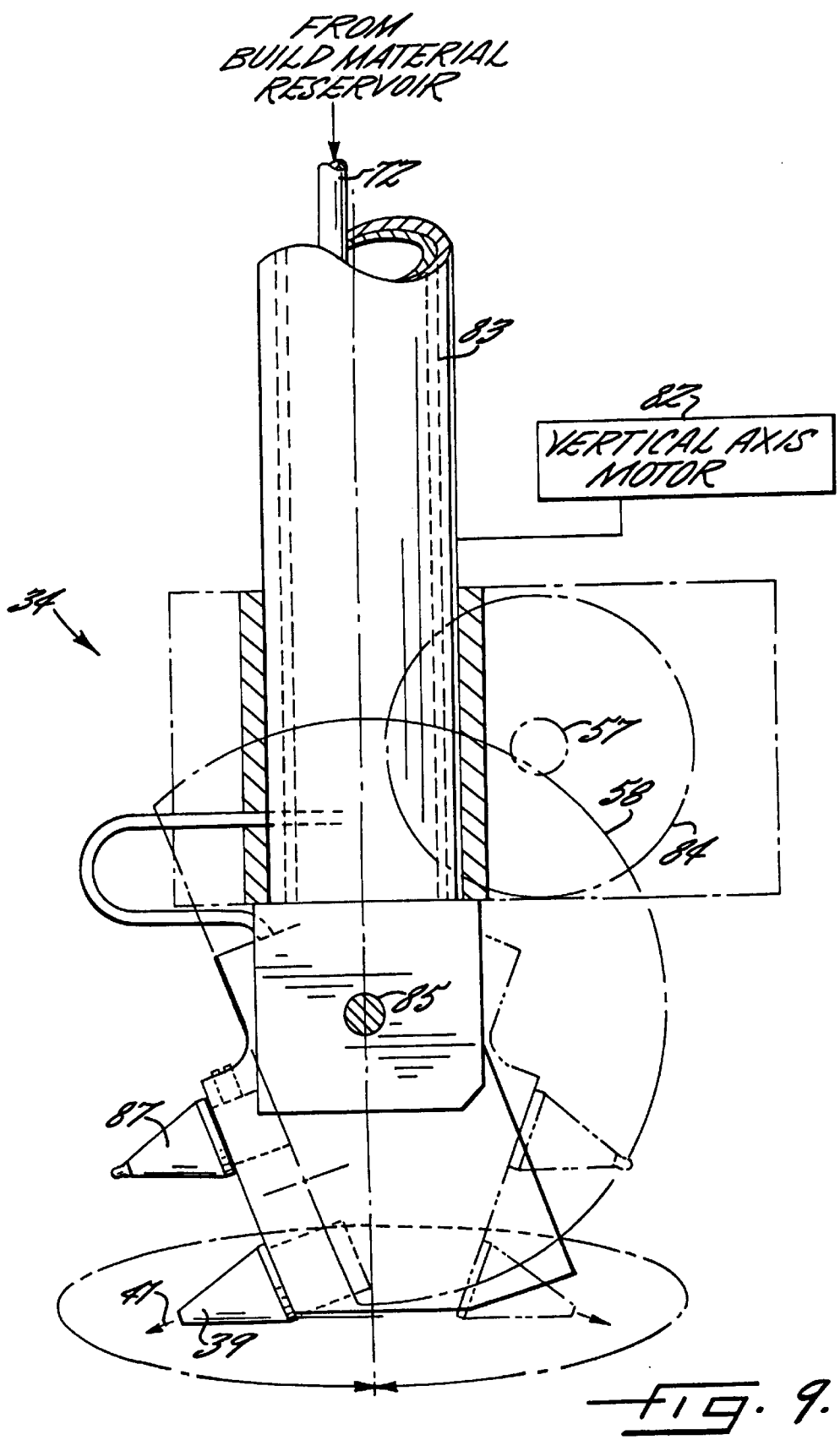
FIG. 9 is a schematic side view of the build material jetting head as shown in FIGS. 7 and 8 illustrating rotation about a vertical axis, that is, phi angle positioning.

As illustrated perhaps best in FIGS. 7 and 8, the jetting head 34 includes means for rotating the piezoelectric jet 39 and a heated body 87 for normalizing surface portions about a horizontal axis or to a desired flip angle. The axis is defined by a horizontal shaft 85 which is driven by an associated motor 84 through drive gears 57 and 58. Accordingly, the firing direction 41 may be adjusted from vertical, as shown in FIG. 7, to near horizontal as shown in FIG. 8. FIGS. 7 and 8 also further illustrate the positioning means which rotates the jetting head 34 about a vertical axis on shaft 83 for rotation to a desired phi angle of rotation. This rotation is powered by vertical axis rotation motor 82 shown in schematic form in FIG. 9.

The heated body 87 is used to periodically normalize surface portions of a partially completed wall. The heated body is further described in copending U.S. patent application Ser. No. 08/326,009, entitled "Apparatus and Method for Thermal Normalization in Three-Dimensional Article Manufacturing," assigned to the assignee of the present invention, and the entire disclosure of which is incorporated herein by reference.

The jetting head 34 preferably carries both the piezoelectric jet 39 and the heated body 87. Both of these elements are heated to a temperature above the melting point of the build material. This heat may be generated by an electrical heating element. In a preferred embodiment, an electrical heater, such as a resistive wire 120, is operatively connected to the heated body 87. Accordingly, the jet 39 receives heated liquid build material from the delivery tube 72 and maintains the build material in a liquid state prior to jetting.

Liquid build material is supplied to the jet 39 through the flexible tube 72. The tube 72 is formed into a spiral coil 86 within the vertical shaft 83 to enable rotation of the jetting head 34 without restricting the flow of build material through the tube and without requiring a rotatable joint and associated seal. The build material tube 72 enters the jetting head through the shaft 83. By rotating the shaft 83, the entire jetting head 34, including the jet 39 and the heated body 87, may be rotated 360 degrees about a vertical axis by the vertical axis motor 82.

A build material passage 104 within the piezoelectric jet 39 provides fluid communication between the baffle 88 and the orifice 40. As discussed above, a heating element, such as an electrical resistance wire, may be used to maintain the build material in a liquid state as it passes from the conduit 72 to the baffle 88, tubular connection 106, and jet 39.

The orifice 40 of the jet 39 is maintained at a predetermined elevation above the surface level of liquid build material in the build material reservoir 78 in the illustrated embodiment. Accordingly, a predetermined negative pressure is exerted upon the liquid build material at the orifice 40. The orifice 40 has a predetermined diameter such that the liquid build material maintains a negative meniscus at the orifice under the influence of the negative pressure. Accordingly, the negative meniscus increases the accuracy and uniformity of successive ballistically jetted droplets and also reduces undesirable accumulation of build material adjacent the orifice 40 of the jet 39.

The piezoelectric jet 39 may include a hollow body including a plastic insert defining a build material flow passage, and a containing a piezoelectric element, in turn, secured within the body by an epoxy. Upon application of an electric signal to the piezoelectric element, the piezoelectric element either contracts or expands depending on the polarity of the signal. In response, an acoustic wave is generated in the liquid build material located in the build material flow passage. This acoustic wave is transmitted through the liquid build material to the negative meniscus at the orifice 40. As a result of the acoustic wave, a droplet of heated liquid build material having a predetermined volume is jetted or ejected from the orifice 40 in firing direction 41 and at a predetermined velocity. The volume and velocity of the droplet are functions of the diameter of the orifice; the size of the piezoelectric element; the intensity and polarity of the electrical signal; and the temperature, surface tension and viscosity of the liquid build material as would be readily understood by those skilled in the art.

In preferred embodiments, it has been found that stable operation of the piezoelectric jet 39 can be sustained at frequencies of up to 12 KHz. Accordingly, the piezoelectric jet 39 is capable of firing 12,000 droplets per second wherein each droplet has a predetermined volume, velocity and firing direction. Other jetting means are also contemplated by the invention as would be readily understood by those skilled in the art. The jet 39 may also be operated to jet droplets in relatively quick succession, that is, in bursts of multiple droplets, so that the droplets in each burst collectively coalesce or solidify at an intended landing position as described in copending U.S. patent application Ser. No. 08/325,889, entitled "Apparatus and Method for Making Three-Dimensional Articles Using Bursts of Droplets," assigned to the assignee of the present invention, and the entire disclosure of which is incorporated herein by reference.

The build material typically melts at a temperature of from about 50° C. to 250° C., cools quickly and adheres to itself, and has a low rate of shrinkage. Such a build material preferably comprises a solution of a resin having a hydroxyl number of from about 5 to 1000, and a molecular weight greater than about 500, dissolved in at least one primary aromatic sulfonamide preferably having a melting point greater than about 25° C. The rheology of the build material is preferably such that a droplet remelts portions of deposited material so as to form a flowable bead. Suitable build materials are further described in commonly assigned copending U.S. patent application Ser. No. 08/325,694, entitled "Build Material for Forming a Three-Dimensional Article," assigned to the assignee of the present invention, and the entire disclosure of which is incorporated herein by reference. In addition, other techniques for jetting or ejecting build material are further described in copending U.S. patent application Ser. No. 08/326,004, entitled "Apparatus and Method for Making Three-Dimensional Article," assigned to the assignee of the present invention, and the entire disclosure of which is incorporated herein by reference.

Turning now additionally to FIGS. 10–14 other significant features of the present invention are described. In this embodiment, the heated body 87 is periodically moved along a predetermined path by positioners 69, 71 under control of the processor 33 to dimensionally normalize an upper surface portion 120b of the article 37. The heated body 87 is supplied electrical power from the schematically illustrated power supply 136. The body 87 is electrically conductive and is moved along a path which should contact the dispensed electrically conductive build material. In other words, contact with the article is determined by the processor 33 based upon electrical continuity or absence of continuity through the body 87 and electrically conductive build material of the article.

An alternative sensing approach is based upon temperature sensing via the schematically illustrated temperature sensor 137. If the heated body 87 is in contact with the deposited build material of the article 37, the build material will absorb heat and thereby lower the sensed temperature of the heated body. Should a gap be present in the article 37, the temperature of the heated body 87 may rise as no heat is removed from the heated body since there is no contact made with the build material.

Figure 10:
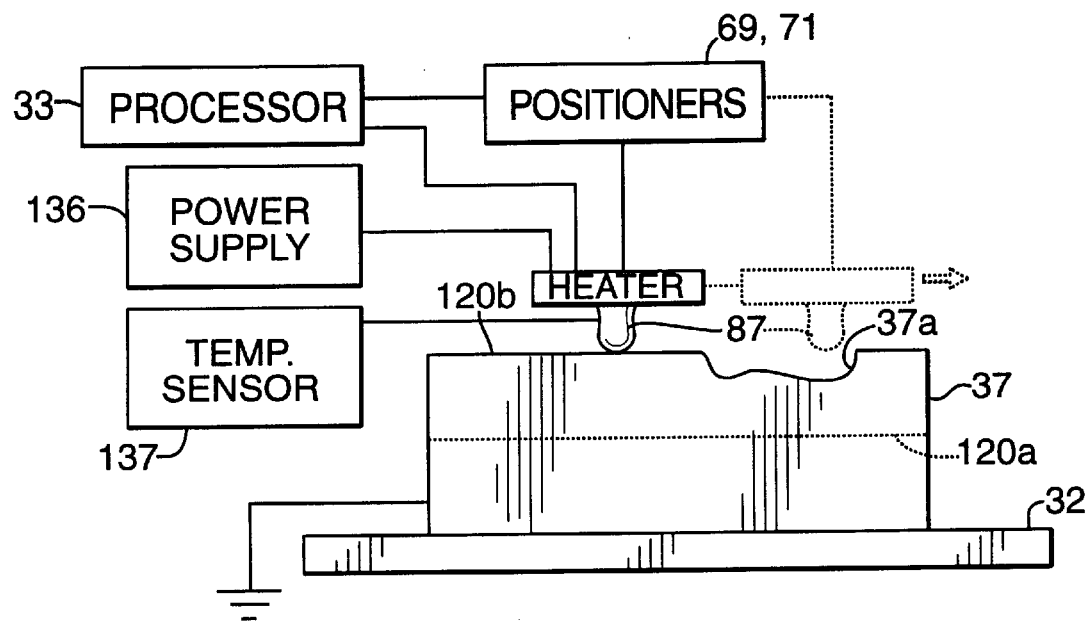
FIG. 10 is a schematic block diagram of a portion of an embodiment of the apparatus according to the invention illustrating article formation deviation sensing of an unformed article portion.

The dotted horizontal line 120a in FIG. 10 represents a prior known good, correct, or desired level during the article construction, and the current upper surface 120b includes a malformed or unformed article portion 37a. Other sensing means may also be used to determine if the article has been constructed to the desired level, such as based upon pressure, for example, as would be readily understood by those skilled in the art. For example, pressure sensing could be accomplished using a strain sensor as would be readily understood by those skilled in the art. As would be also readily understood by those skilled in the art, because the jetting head 34 which carries the heated body 87 can build along five degrees of freedom, the sensed portions of the article are not limited to vertically extending article portions.

Figure 11:
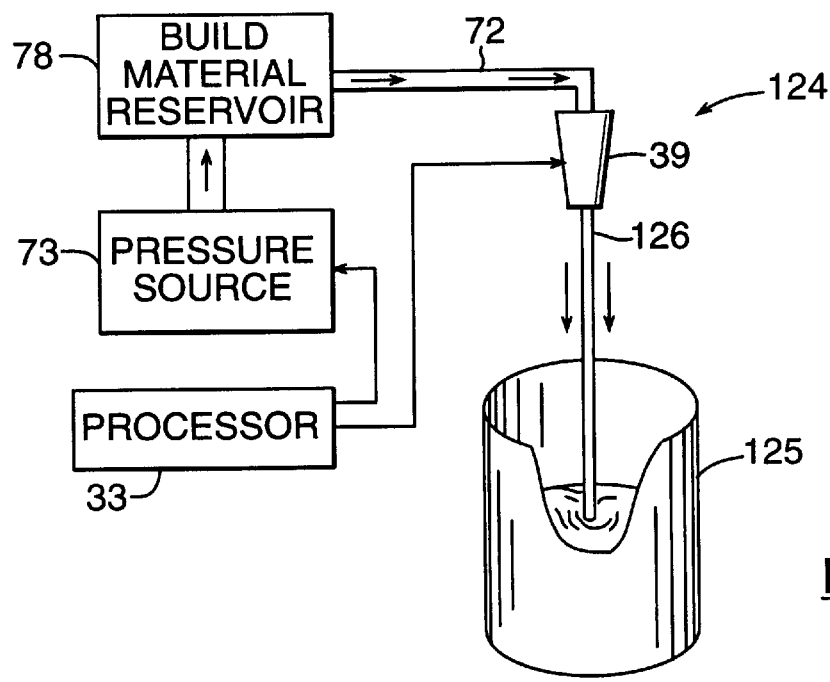
FIG. 11 is a schematic block diagram of a portion of the apparatus according to the invention illustrating purging of the build material jet.

A malformed or unformed article portion may be caused by any of a number of factors, such as a clogged jet 39 or heated tube 72, or a disturbance within the housing 31. As shown in FIG. 11, upon sensing of a deviation or deformation of the article 37, the build material jet 39 may be positioned to a purging station 124 including a purge container 125. The purge container 125 collects a stream of build material 126 caused to flow through the jet 39, such as by the illustrated build material reservoir 78 and pressure source 73. Alternately, or in addition thereto, the jet 39 may be excited by the processor 33 to generate a stream of build material as would also be readily understood by those skilled in the art.

Figure 12A:
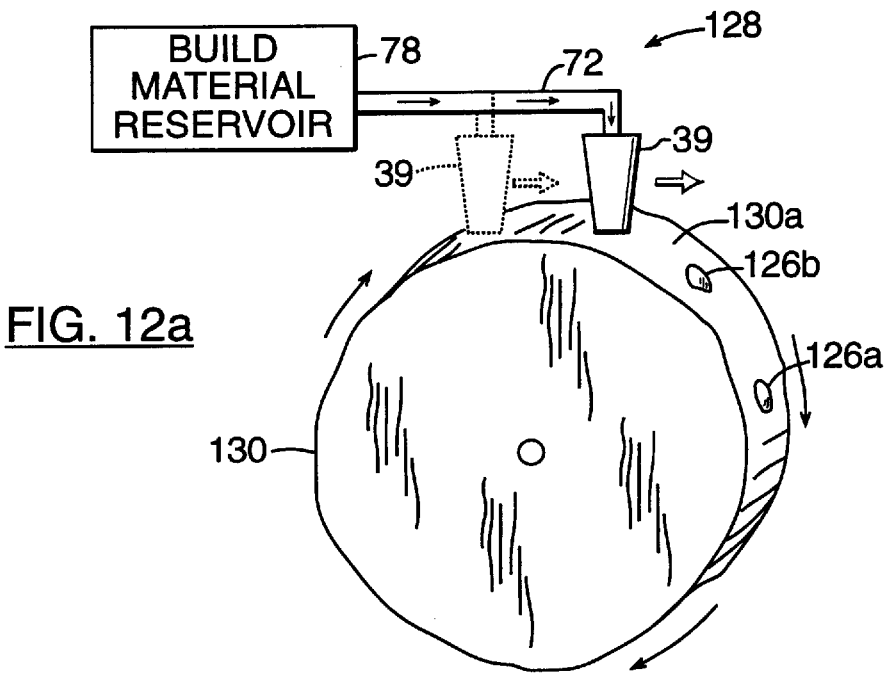
FIG. 12a is a schematic block diagram of a portion of the apparatus according to one embodiment of the invention illustrating cleaning of the orifice and adjacent portions of the build material jet.

Once the jet 39 and feeder line 72 have been purged, such as to remove a clog or air bubble, the jet is moved to an orifice cleaning station 128 as shown in FIG. 12a. The orifice cleaning station 128 illustrative includes a generally cylindrically shaped body 130 made of an absorbent material. The jet 39 is positioned so that the orifice and adjacent portions of the jet contact the body 130 of absorbent material to remove any undesired material, such as accumulated build material.

In particular, the body 130 of absorbent material is rotatably mounted so that the jet positioning means may desirably advance the jet 39 along a predetermined path of travel intersecting outer peripheral portions 130a of the body of absorbent material so that the jet orifice and adjacent portions of the build material jet contact the outer peripheral portions of the body of absorbent material without a wiping motion. Rather, the orifice is pressed against the adjacent outer peripheral portion 130a and is cleaned without increasing the likelihood of contamination of the relatively small orifice and adjacent jet portions as may be caused if a wiping motion were used. Moreover, the delicate negative meniscus at the orifice of the jet 39 is not likely to be disrupted by the above described motion and contact with the body of absorbent material 130.

The advancement of the jet generally tangent to the body 130 also serves to rotate the body of absorbent material to present a different peripheral portion for a successive cleaning. Areas of build material 126a, 126b may collect on the outer peripheral portions 130a as schematically illustrated. Considered in different terms, the purging station 124 and orifice cleaning station 128 may be considered part of recovery means for correcting or adjusting for a deviation during construction of the article 37.

Figure 12B:
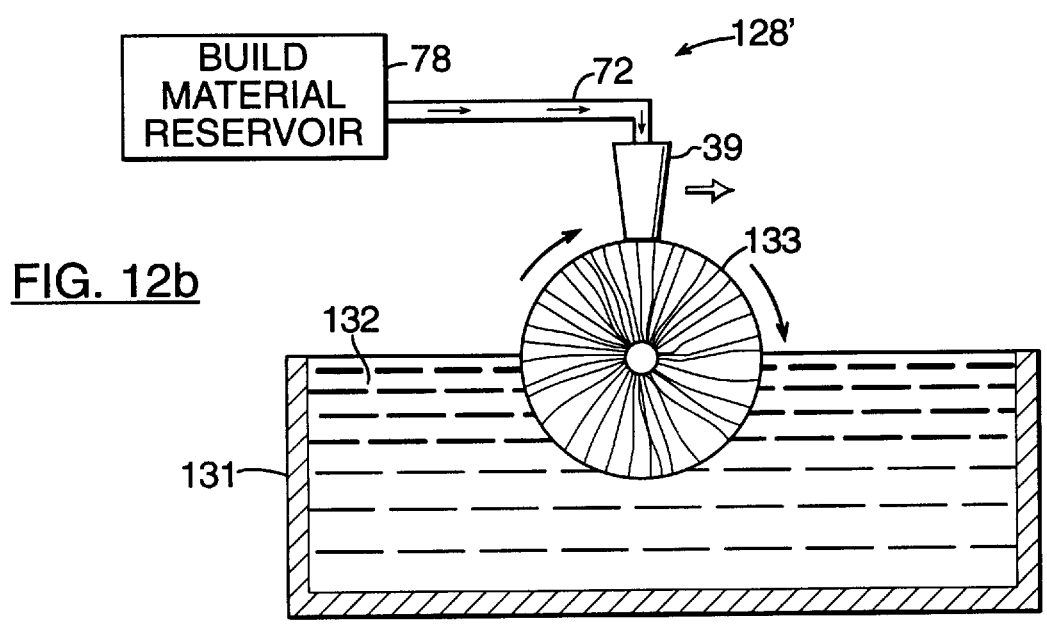
FIG. 12b is a schematic block diagram of a portion of the apparatus according to another embodiment of the invention illustrating cleaning of the orifice and adjacent portions of the build material jet.

Referring now additionally to FIG. 12b, another embodiment of a cleaning station 128' is illustrated. This embodiment may be used in place or in addition to the cleaning station 128 as described above. The illustrated cleaning station 128' includes a reservoir or container 131 of a liquid solvent or cleaning solution 132, such as an alcohol or other suitable cleaning solvent as would be readily appreciated by those skilled in the art. In the illustrated embodiment, a brush or other cleaning wheel 133 is partially submerged in the cleaning solvent 132. The brush 133 is rotated in the solvent and with an upper portion in contact with the end of the jetting jet 39 to thereby wet clean the orifice of the jet.

The solvent 132 may also be used to deprime the jet 39 which may be desirable in certain circumstances. Accordingly, in one preferred embodiment of the invention, this cleaning station 128' may be used prior to the purging of the jet and feeder lines 72, especially since contact with the liquid solvent or cleaning solution 132 may be used to desirably disrupt the meniscus of build material and thereby deprime the jet 39.

Figure 13:
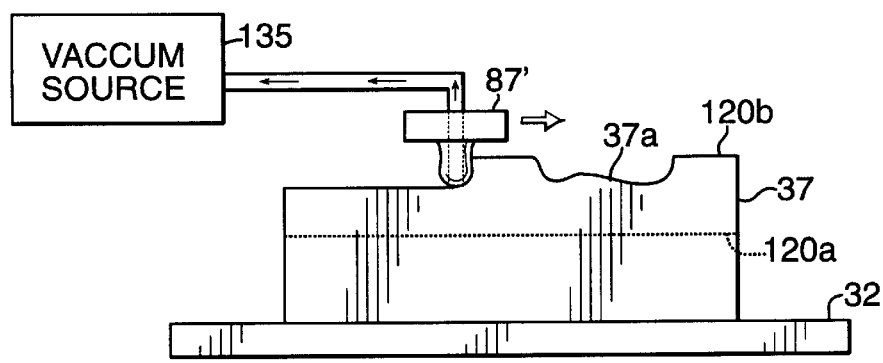
FIG. 13 is a schematic block diagram of a portion of the apparatus according to the invention illustrating removing of a portion of the article.

Referring now additionally to FIG. 13, the recovery means may preferably further include removing means for removing a portion of dispensed build material responsive to a sensed deviation. In one embodiment of the invention, the build material may be a meltable material. Accordingly, the removing means may comprise thermal displacing means, as illustratively provided by the heated body 87' for selectively melting and displacing dispensed build material. In other words, the thermal normalization or displacing means may also be used to remove a portion of the article having a malformed or unformed portion 37a.

The illustrated heated body 87' includes a passageway therethrough connected in fluid communication with the illustrated vacuum source 135. The heated body 87' is moved along a predetermined path of travel until the undesired article portion is removed. In other embodiments of the invention, the removal of dispensed and solidified build material may also be effected by mechanical abrading, cutting or scraping, or by chemical means, for example, as would be readily understood by those skilled in the art.

Figure 14:
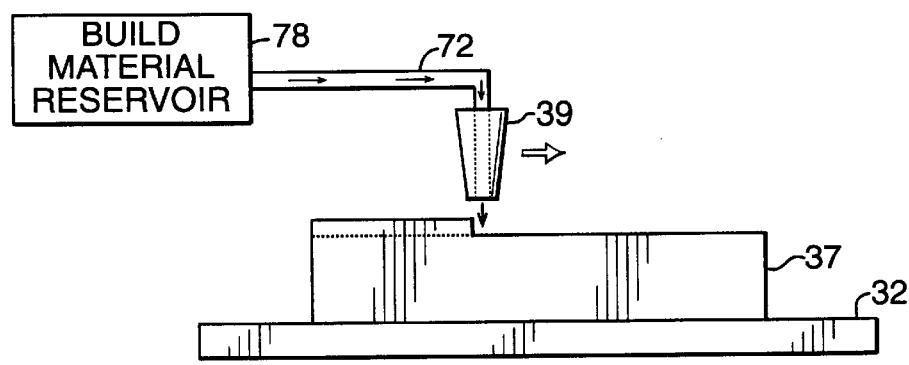
FIG. 14 is a schematic block diagram of a portion of the apparatus according to the invention illustrating resuming construction of the article after removal of a portion.

The removing means may be operated to remove a portion of dispensed build material down to the previous sensed article portion 120a. As shown in FIG. 14, once the build material has been removed back to the desired level 120a, resuming means cooperates with the build material dispensing means for resuming construction of the article 37 by dispensing build material from the reservoir 78. The resuming means may be provided in part by the processor 33 operating under stored program control, as would be readily understood by those skilled in the art.

Figure 15:
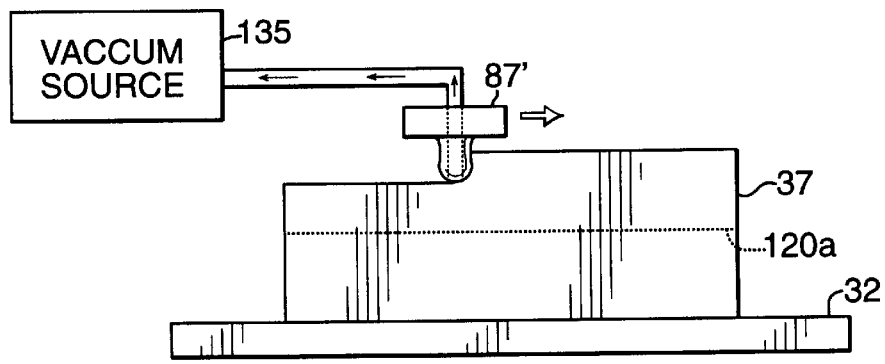
FIG. 15 is a schematic block diagram of a portion of the apparatus according to the invention illustrating removing of an undesired portion of the article.

Turning now to FIGS. 15 and 16, another aspect of deviation sensing and recovery in accordance with the present invention is explained. In this embodiment, the deviation sensing means comprises article data deviation sensing means for sensing a deviation of the article defining data during construction of the article. This deviation sensing may be implemented in the processor 33, for example. In other words, the article can have a portion thereof redesigned and constructed to increase efficiency and overall throughput of article formation. The portion of the article to be modified may be readily removed by the thermal removing or displacing means provided by the heated body 87' and vacuum source 135 as illustrated in FIG. 15. The article 37' may then be constructed with a new overhanging or extended portion. 37b' as illustrated in FIG. 16.

Still another embodiment of the deviation and recovery aspects of the invention are explained with reference to FIG. 17. The deviation sensing means may be provided by jet dispensing deviation sensing means for sensing a deviation in dispensing of droplets of build material from the build material dispensing jet 39 and feeder means as provided, in part, by the illustrated heated tube 72. In the illustrated embodiment, an optical sensor provides the jet deviation dispensing means and includes a source 142 and associated detector 144 cooperating with the processor 33 as would be readily appreciated by those skilled in the art. The optical sensor may detect the presence or absence of droplets 145 of build material being ejected from the orifice 40 of the jet 39. The sensing may be implemented during construction of an article 37 or may be conducted separately from construction of the article as will be readily appreciated by those skilled in the art. As will also be readily understood by those skilled in the art, other sensors, particularly of the proximity sensing type, may also be positioned adjacent the orifice for sensing proper dispensing of build material from the jet.

As understood with reference to FIGS. 18 and 19 the deviation sensing means may be provided by build rate deviation sensing means for periodically sensing a build rate of the build material dispensing means based upon optical sensing of a test pattern 121, for example. Build rate may be influenced by many factors within the apparatus and external thereto. Accordingly, build rate deviation sensing and recovery is an important aspect of the invention.

In this embodiment, the recovery means preferably includes means cooperating with the build rate deviation sensing means for constructing the article based upon different build rates. The determination of the build rate may be readily determined by the processor 33, and the new or current build rate then used in construction of the article 37 until a next build rate sensing.

The illustrated build rate deviation sensing means may be provided by operating the apparatus to construct a test pattern 121 formed on the platform 32 or other surface, and optically inspecting the pattern to verify the build rate of the build material jet. An optical sensor is provided by a source 91 and detector 92 to sense reflected light from the test pattern 121 to determine a build rate. Alternatively, a simple test structure may be formed to determine a build rate. The build rate may also be calculated using other deviation sensing approaches as described above, such as by using the electrically conductive heated body 87 or temperature sensing to periodically sense the article. In yet another embodiment, a sample amount of build material may be dispensed and weighed to determine a build rate or deviation thereof. Alternately, a sample volume may also be dispensed and measured to determine a build rate. In addition, the testing pattern and sensing procedure may also be used to give an indication to the processor of whether the purging and cleaning of the jet 39 has been successful as described above, as will be readily appreciated by those skilled in the art.

Figure 20:
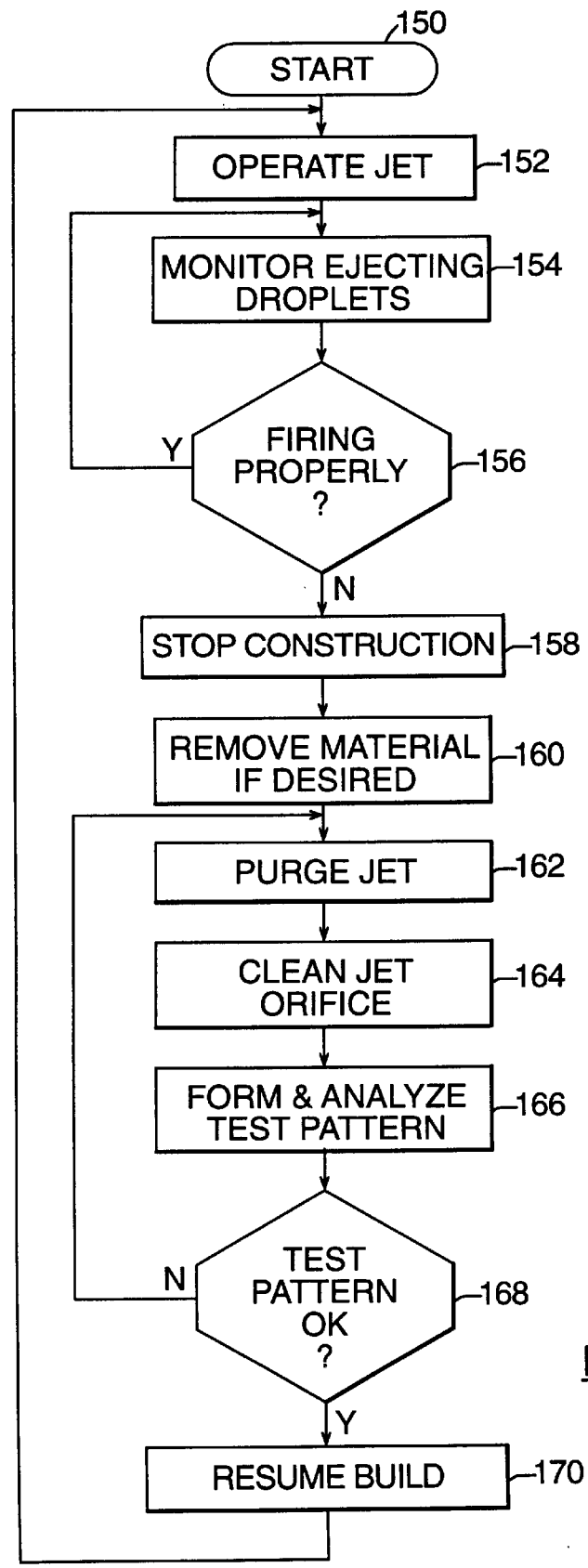
FIG. 20 is a flowchart illustrating sensing of ejected build material droplets, and recovery in accordance with an embodiment of the invention.

Turning now to the flowchart of FIG. 20 operation of the apparatus 30 in accordance with one aspect of the invention is further explained. From the start (Block 150) the jet is operated at Block 152. The jet 39 may be continually sensed or monitored for a deviation at Block 154. If the jet is not firing properly at Block 156, construction of the article is stopped (Block 158) and any undesired portions of dispensed build material are removed at Block 160, if needed. The jet 39 is then preferably purged (Block 162) and its orifice 40 cleaned (Block 164). The test pattern 121 may then be formed and analyzed (Block 166), and if proper (Block 168), the construction or building of the article may be resumed at Block 170.

Figure 21:
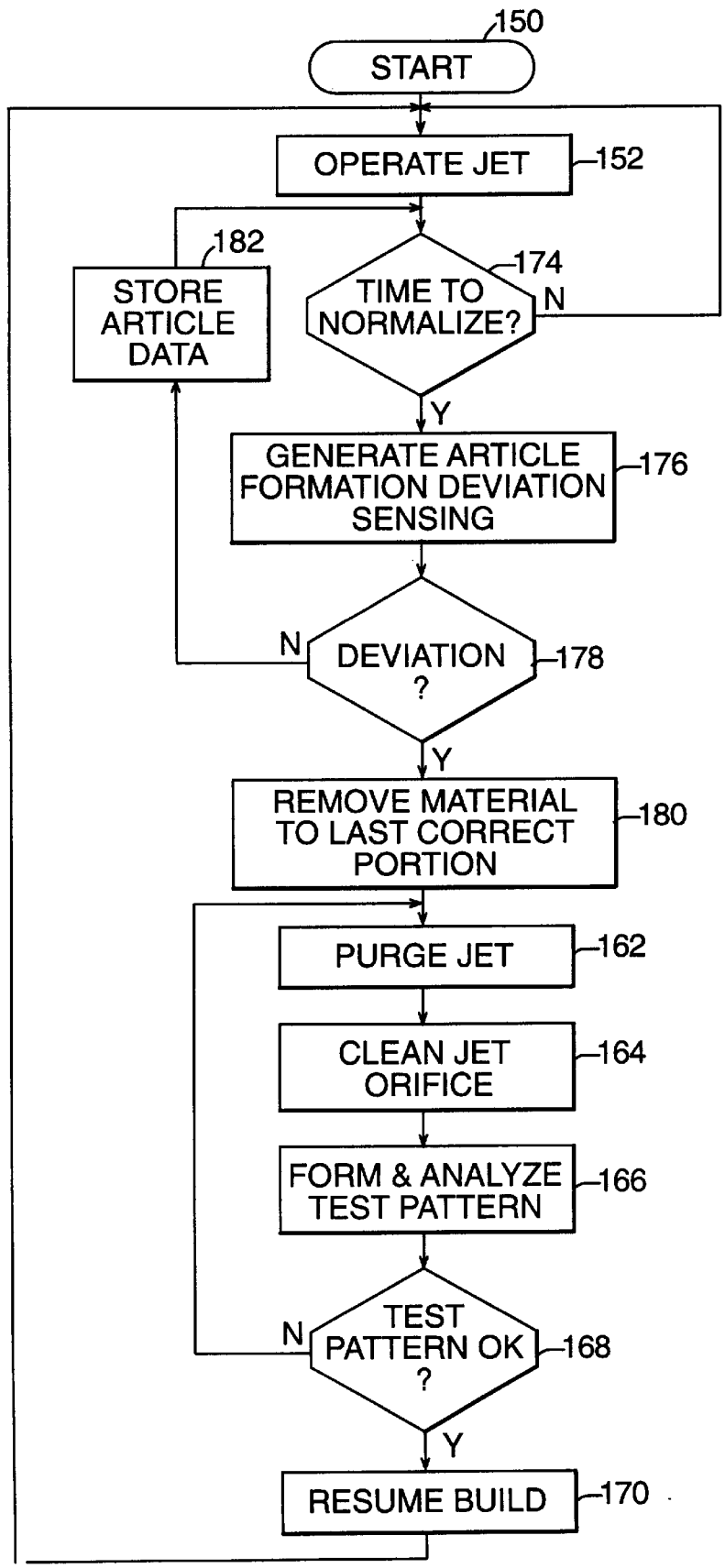
FIG. 21 is a flowchart illustrating article formation sensing and recovery in accordance with an embodiment of the present invention.

Referring now additionally to the flowchart of FIG. 21, in addition or as an alternate to build material jet deviation sensing, the article formation deviation sensor may be periodically activated during the dimensional normalizing (Blocks 174 and 176). If a deviation is determined or sensed at Block 178, dispensed build material may be removed down to a last known correct portion (Block 180). If a deviation is not detected, the article defining data for this correct portion may be stored at Block 182. The other portions of the flowchart of FIG. 21 are similar to those of FIG. 20 and require no further description.

Figure 22:
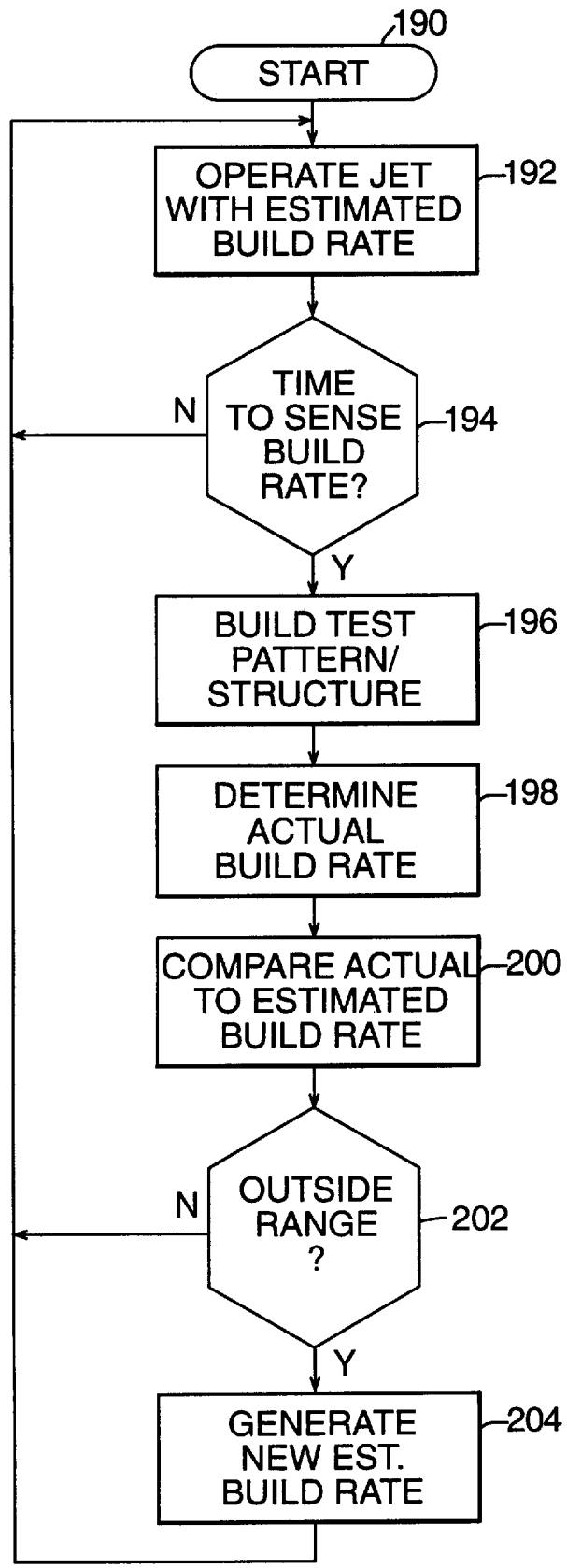
FIG. 22 is a flowchart illustrating article build rate deviation sensing and recovery in accordance with the present invention.

Referring now to the flowchart of FIG. 22, operation of the apparatus is further explained and reviewed relating to build rate deviations. From the start 190, the jet 39 is operated with an estimated or initially determined or supplied build rate (Block 192). When a time has passed or other occurrence where the build rate should be determined and adjusted, if necessary (Block 194) a test pattern or test structure is formed at Block 196. The build rate is determined based upon the rate of growth of a test portion or sample, for example, responsive to a predetermined number of stimulations provided to the piezoelectric element of the jet 39 at Block 198. If the build rate is outside a predetermined range as determined at Blocks 200, 202, a new estimated build rate may be generated (Block 204) and used for subsequent construction of the article 37 as would be readily understood by those skilled in the art.

Figure 23:
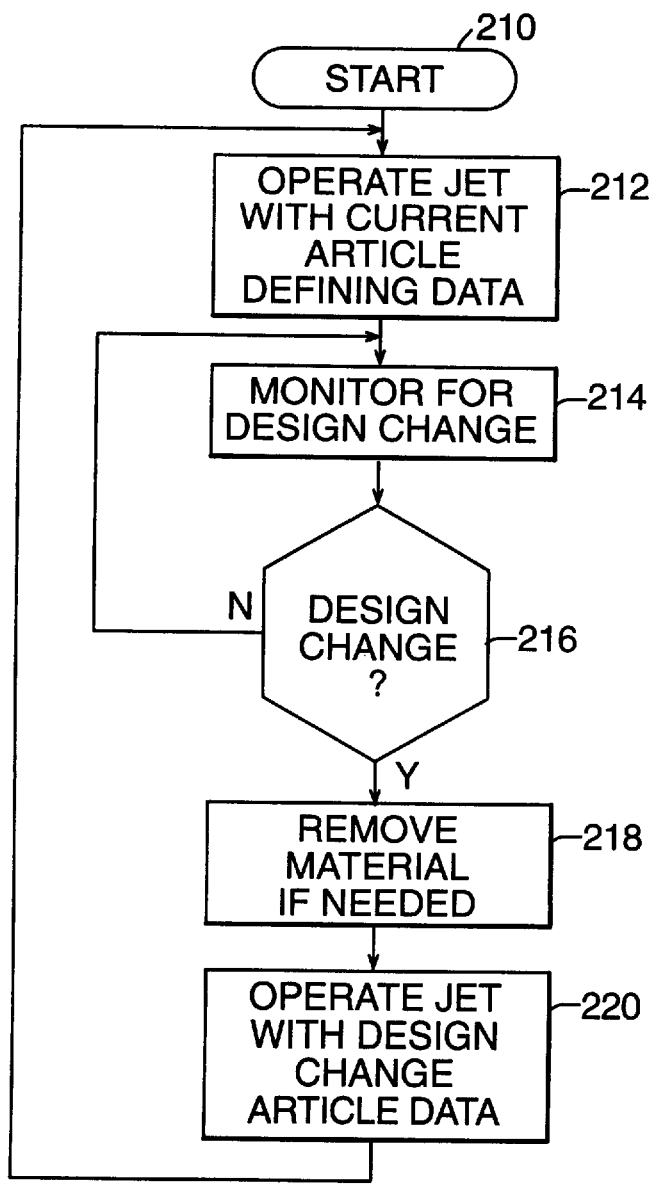
FIG. 23 is a flowchart illustrating article defining data deviation sensing and recovery in accordance with the present invention.

The flowchart of FIG. 23 illustrates sensing of a design change deviation during construction of the article 37. Rather than completing construction of a no longer desired article, and rather than starting over again from scratch, another aspect of the present invention allows for redesign during construction. From the start (Block 210), the jet is operated with the current article defining data (Block 212). The design data is monitored at Block 214. If a design change is indicated at Block 214, as could be readily determined by the processor 33 cooperating with an input device, for example, undesired material may be removed if needed (Block 218). The jet may then be operated with the new or changed article defining data to construct the redesigned article at Block 220.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for making a three-dimensional article based upon article defining data, said apparatus comprising:

a platform;

build material dispensing means positioned adjacent said platform for dispensing build material based upon the article defining data to construct the article on said platform;

normalization means for dimensionally normalizing the article during construction thereof by displacing portions of dispensed build material; and article formation deviation sensing means cooperating with said normalization means for sensing a deviation in formation of the article during normalization thereof.

2. An apparatus according to claim 1 wherein said article formation deviation sensing means comprises means for sensing the article at predetermined intervals during construction of the article.

3. An apparatus according to claim 1 wherein said article formation deviation sensing means comprises temperature sensing means operatively connected to said normalization means for sensing a deviation in formation of the article during normalization thereof based upon a temperature of said normalization means being different when contacting adjacent portions of build material than when not contacting adjacent portions of build material.

4. An apparatus according to claim 1 wherein the build material is electrically conductive, wherein said normalization means comprises an electrically conductive body, and wherein said article formation deviation sensing means comprises electrical conductivity sensing means cooperating with the electrically conductive build material and said electrically conductive body for sensing article portions based upon electrical continuity.

5. An apparatus according to claim 1 wherein said article formation deviation sensing means comprises contact sensing means for sensing article portions by physical contact therewith.

6. An apparatus according to claim 1 further comprising recovery means responsive to said article formation deviation sensing means for operating said build material dispensing means to correct a deviation in formation of the article.

7. An apparatus according to claim 6 wherein said recovery means comprises patching means for operating said build material dispensing means to form a patch of build material to correct a deviation in formation of the article.

8. An apparatus according to claim 6 wherein said recovery means further comprises removal means for operating said normalization means to remove a portion of dispensed build material to correct a deviation in formation of the article.

9. An apparatus according to claim 8 wherein the build material is a meltable material; and wherein said normalization means comprises thermal displacing means for selectively melting and displacing dispensed build material.

10. An apparatus according to claim 9 wherein said removal means further comprises vacuum means cooperating with said thermal displacing means for removing melted build material.

11. An apparatus according to claim 8 wherein said recovery means further comprises resuming means cooperating with said build material dispensing means for resuming construction of the article after a portion of dispensed build material has been removed.

12. An apparatus according to claim 6 wherein said build material dispensing means comprises a build material jet for dispensing build material in a plurality of droplets and feeding means for feeding liquid build material to said build material jet; and wherein said recovery means comprises purging means for purging said build material jet and said feeding means.

13. An apparatus according to claim 12 wherein said recovery means further comprises testing means for testing if said build material jet and said feeding means are operating properly after being purged.

14. An apparatus according to claim 6 wherein said recovery means further comprises orifice cleaning means for cleaning an orifice portion of said build material dispensing means.

15. An apparatus according to claim 14 wherein said orifice cleaning means comprises wet cleaning means for applying a cleaning liquid to an orifice portion of said build material dispensing means.

16. An apparatus according to claim 14 wherein said orifice cleaning means comprises absorbent cleaning means for contacting an absorbent body of material to an orifice portion of said build material dispensing means.

17. An apparatus according to claim 14 wherein said recovery means further comprises testing means for testing if said build material dispensing means is operating properly after being cleaned.

18. An apparatus according to claim 1 wherein said normalization means comprises:

a body for contacting dispensed build material; and body positioning means for positioning said body along a predetermined path of travel relative to the dispensed build material.

19. A method for making a three-dimensional article based upon article defining data, the method comprising the steps of:

dispensing build material from a build material dispenser based upon the article defining data to construct the article;

dimensionally normalizing the article during construction thereof by displacing portions of dispensed build material; and sensing a deviation in formation of the article during normalization thereof.

20. A method according to claim 19 wherein the sensing step is performed at predetermined intervals during construction of the article.

21. A method according to claim 19 wherein the sensing step comprises sensing for a deviation in formation of the article during normalization thereof based upon a sensed temperature of said normalization means being different when contacting adjacent portions of build material than when not contacting adjacent portions of build material.

22. A method according to claim 19 wherein the step of normalizing comprises contacting the dispensed build material with an electrically conductive body, and wherein the sensing step comprises sensing electrical continuity between the electrically conductive body and dispensed build material.

23. A method according to claim 19 further comprising the step of recovering from a deviation in formation of the article.

24. A method according to claim 23 wherein the step of recovering further comprises removing a portion of dispensed build material to correct a deviation in formation of the article.

25. A method according to claim 24 wherein the step of recovering further comprises the step of resuming dispensing of build material after a portion of dispensed build material has been removed.

26. A method according to claim 23 wherein the step of recovering further comprises purging a build material dispenser.

27. A method according to claim 26 wherein the step of recovering further comprises cleaning an orifice portion of the build material dispenser.

28. A method according to claim 27 wherein the step of recovering further comprises testing if a build material jet is operating properly after being purged and cleaned.

* * * * *